United States Patent [19]
Gregerson et al.

[11] 3,809,510
[45] May 7, 1974

[54] COMBINATION PRESSURE RELIEF AND ANTI-SLUGGING VALVE FOR A SCREW COMPRESSOR

[75] Inventors: David A. Gregerson, Richmond, Ind.; Vinod K. Arora, Dayton, Ohio

[73] Assignee: Philco-Ford Corporation, Blue Bell, Pa.

[22] Filed: Mar. 22, 1973

[21] Appl. No.: 343,871

[52] U.S. Cl.................. 418/201, 418/15, 418/157, 418/180, 417/310, 417/440
[51] Int. Cl. .......................................... F04b 23/14
[58] Field of Search ............ 418/201, 15, 157, 180; 417/310, 440

[56] References Cited
UNITED STATES PATENTS

| | | | |
|---|---|---|---|
| 3,301,474 | 1/1967 | Buchel | 417/310 |
| 3,476,055 | 11/1969 | Crowther | 417/440 |
| 3,511,581 | 5/1970 | Singels | 417/310 |
| 3,558,248 | 1/1971 | Parker | 418/201 |
| 3,738,780 | 6/1973 | Edstrom | 417/310 |

Primary Examiner—C. J. Husar
Attorney, Agent, or Firm—Robert D. Sanborn; Harry W. Hargis, III

[57] ABSTRACT

A combination pressure relief and anti-slugging port is so positioned relative to the main discharge port of a screw compressor that, as the screws are rotated, the main rotor lobe first exposes the pressure relief port while the main discharge port remains covered by an adjacent gate rotor lobe, followed by the rotating lobes uncovering both ports simultaneously, and by covering of the relief port by the main rotor lobe as the main discharge port remains uncovered by the gate rotor lobe. A valve is provided in the pressure relief and anti-slugging port so that the compressed gas can be discharged therefrom, in the event the built-in compression ratio exceeds the operating compression ratio, while the relief port alone is uncovered.

6 Claims, 4 Drawing Figures

PATENTED MAY 7 1974 3,809,510

3,809,510

COMBINATION PRESSURE RELIEF AND ANTI-SLUGGING VALVE FOR A SCREW COMPRESSOR

BACKGROUND OF THE INVENTION

This invention relates to screw compressors, and particularly to improved discharge port and valve construction for enhancing the efficiency and durability of screw compressors used in refrigeration apparatus.

Refrigerant screw compressors characteristically operate under high torque requirements, with resultant galling of bearing surfaces that tends to detract from the useful life of the compressor. Galling arises from excessive pressures within the compressor due to slugging resulting from certain refrigeration operating conditions. Refrigerant compressors in general are subject to slugging, and provision usually is made for compensation. For example, suitable valving may be included to relieve excess pressure arising from entry of slugs of liquid with the gaseous refrigerant undergoing compression.

Valving of the aforementioned type has been known to be deleterious to the efficiency of operation of a compressor. In terms of compressor dimensions and operating pressures, efficiencies take into account the built-in compression ratio, which is the ratio of the pressure within the compressor to the suction pressure, just before the discharge port is exposed to the discharge outlet. The built-in compression ratio (BICR) is further a function of the built-in volume ratio (BIVR). Also taken into account is the operating pressure ratio (OPR), which is the ratio of the head, or condenser, pressure to the suction pressure.

It is a general objective of the invention to provide improved compressor valve and port construction taking into account the aforementioned parameters affecting efficiency of operation.

A more specific objective of the invention is to provide improved pressure relief valve and port structure which will allow the value of the BICR to be limited to, or slightly above, the value of the OPR.

SUMMARY OF THE INVENTION

In achievement of the foregoing as well as other objectives, the invention contemplates provision, in a screw compressor, of combination pressure-relief and anti-slugging port structure so cooperably disposed in relation to the main compressor discharge port as to be uncovered prior to uncovering of the main discharge port, and relief valve structure for the uncovered relief port that will be opened should the built-in compression ratio of the compressor exceed its operating pressure ratio, whereby gas may be discharged first from the relief port, then simultaneously from both the main port and the relief port as the main port is uncovered.

The manner in which the foregoing as well as other objectives and advantages may best be achieved will be understood from a consideration of the following description, taken in light of the accompanying drawing.

DESCRIPTION OF THE PREFERRED EMBODIMENT

Figure 1:
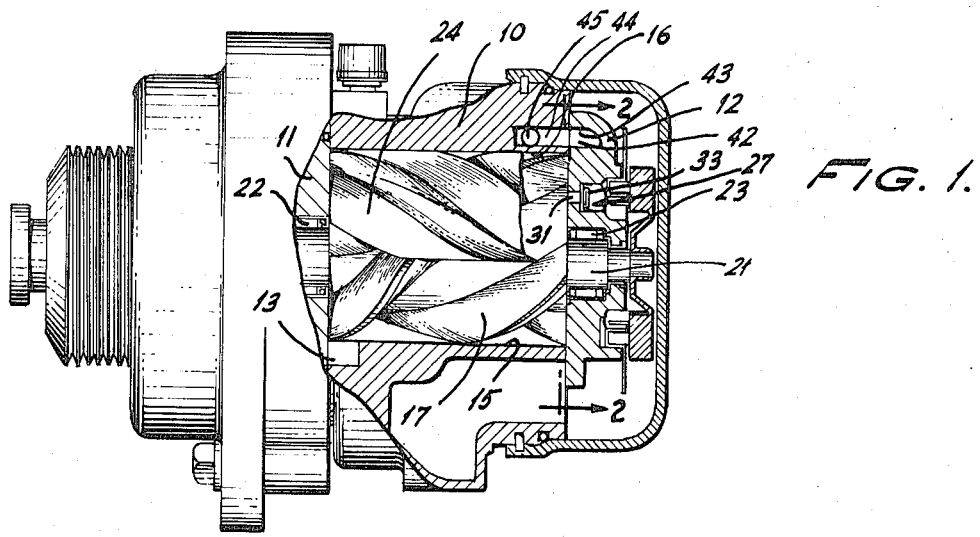
FIG. 1 is a longitudinal, partially sectional and fragmented showing of a screw compressor embodying, in the right-hand portion thereof, novel discharge port and valve structure to which the invention is particularly directed.
Figure 2:
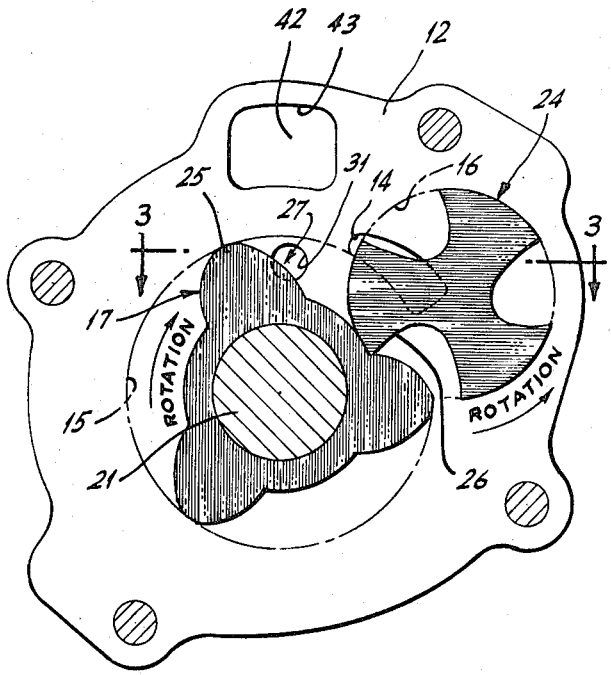
FIG. 2 is a sectional showing, with some parts shown diagrammatically, taken generally along the line indicated by arrows 2—2 applied to FIG. 1.

With more detailed reference to the drawing, and first to FIGS. 1 and 2, a compressor housing 10 comprises a pair of oppositely disposed end plates 11 and 12, one including an inlet port 13 and the other including an outlet port 14. As is best seen in broken lines in FIG. 2, housing 10 is provided with a pair of parallelly extending bores 15 and 16 having common intersections, which bores, in cross section, are generally in the form of a figure eight.

A helical main rotor 17 in bore 15 is rotatably mounted on a longitudinal shaft 21 and is supported in bearings 22 and 23 provided in end plates 11 and 12. A mating helical rotor 24, known as the gate rotor, is mounted for rotation in bore 16, and is confined between end plates 11 and 12. In accordance with known screw compressor construction, main rotor 17 comprsies, as is best seen in the end showing thereof in FIG. 2, three lobes 25, the flanks of which lobes are generated by the crest edges of gate rotor 24, and the grooves 26 of the mating gate rotor 24 are generated by the crest edges of the main rotor lobes 25. Thus the helical main rotor 17 and the helical gate rotor 24 mesh, and when rotated form a continuous seal line which moves diagonally across the housing from the inlet end to the outlet end, along the complete length of the rotors from plate 11 to plate 12.

In operation of the compressor, gaseous refrigerant is drawn into inlet port 13 by the action of rotors 17 and 24 rotating in opposite directions to open the pockets therebetween. The pockets formed by the rotors continue to draw in gas until they reach their maximum displacement, at which point they are cut off from inlet port 13, and compression of the gas begins as rotors 17 and 24 continue to rotate. When the trailing crest edge of the main rotor lobe 25 passes beyond the intersection of bores 15 and 16 a pressure pocket is formed between a leading flank of one of the main rotor lobes 25, a groove 26 of the gate rotor, and the inner surface of end plate 12. After predetermined amount of internal compression from continued rotation of the rotors, the pockets are brought, successively, into communication with outlet port 14 in end plate 12.

Under certain conditions of operation, the gas undergoing compression has a relatively high liquid content, and, as this liquid is transported through the compressor, a portion of such liquid is entrapped in the pocket. With no means for this liquid to escape other than the normal running clearances between the parts defining the pocket, major damage to the compressor could result from continued rotation of rotors 17 and 24, since the liquid is incompressible.

Figure 4:
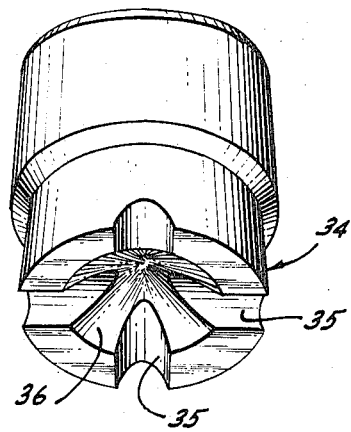
FIG. 4 is an enlarged perspective view of an element of the structure seen in elevation in FIG. 3.
Figure 3:
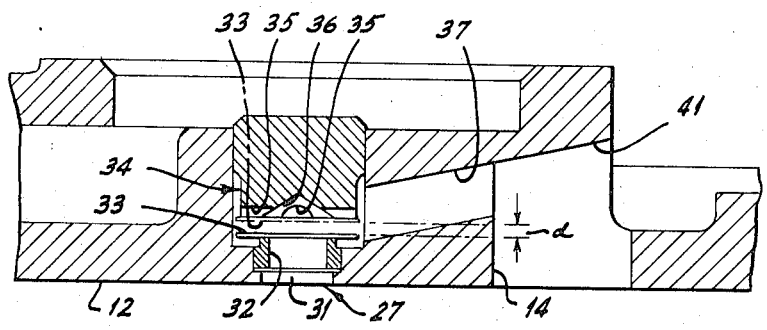
FIG. 3 is an enlarged sectional view taken generally along the lines indicated by arrows 3—3 applied to FIG. 2, and comprising a detailed showing of port and valve structure seen in the preceding figures.

In especial accordance with the invention, and with particular reference to FIGS. 2, 3, and 4, a combination pressure relief and anti-slugging valve and port means 27 is provided in end plate 12. Valve and port means 27 comprises a port 31 provided with a valve seat 32 in end plate 12, a disk-shaped valve plate 33, and a generally cylindrical valve stop 34 including intersecting grooves 35 extending over an end wall thereof. As is best seen in FIG. 4, the central portion of the end wall of stop 34 is recessed, or countersunk, in the shape of a cone as seen at 36, so that the end wall presents four arcuate, plateau-like surfaces toward valve plate 33 and against which arcuate surfaces the plate will be stopped (see broken line showing of plate 33) in operation of the compressor. Valve port 31 communicates through a lateral passage 37 with the main discharge port 14, and a passage 41 leads from port 14 into a delivery region such as discharge chamber 42 (FIG. 1).

A generally rectangular port 43 in end plate 12 leads from chamber 42 to a generally rectangularly shaped passage 44 in compressor housing 10, the passage 44 terminating in a compressor discharge fitting seen from the inside at 45.

A feature of the invention is that the area of the valve port 31 exposed to the compression pockets defined by rotors 17, 24 and bores 15, 16 is substantially equal to the area of the valve exposed to the condenser pressure, through passage 37 (FIG. 3). The passages leading from the rotors and the pressure chamber are of such relatively short length as to ensure optimum volume-to-clearance volume ratio. As will be appreciated from FIG. 2, a further feature of the invention is that pressure relief port 31 is so positioned relative to discharge port 14 that relief port 31 is covered and uncovered by lobes 25 of main rotor 17 alone, and port 31 will be uncovered prior to the time that discharge port 14 is uncovered by lobes of rotor 24, so that gas undergoing compression may be discharged from port 31, when the BICR exceeds the OPR. Continued rotation of the rotors uncovers both ports 31 and 14, affording simultaneous flow therefrom, followed by covering of port 31 while port 14 remains uncovered for subsequent discharge of gas therefrom. As the rotors continue to rotate, both ports 31 and 14 are closed and a new compression phase begins.

Considering relief port and valve means 27 in more detail, and with reference to FIG. 3, valve plate 33 comprises a disk-shaped wafer of steel, about 0.015 inch thick. Valve plate 33 has a travel distance $d$ of about 0.050 inch, and is designed to open and close port 31 if the following criteria are satisfied:

Valve plate 33 opens or remains open if: BICR > (Area Ratio) × (OPR).

Valve plate 33 closes or remains closed if: BICR < (Area Ratio) × (OPR).

The advantage of such a relationship is the conservation of power required of the prime mover, i.e., automobile engine, by eliminating extra work required as a result of under-compression or over-compression.

Considering the above stated criteria in more detail, the BICR is defined as the ratio of pressure within the compressor, just before discharge port 14 is uncovered, to the suction pressure. The term Area Ratio may be expressed as $A_2/A_1$, wherein $A_1$ is the effective area on which pressure within the compressor acts on the valve plate or wafer 33, and $A_2$ is the effective area on which the head, or back, pressure acts on the valve plate or wafer 33. By virtue of this construction no return spring is required for valve plate 33, with the inherent advantage of rapid response to opening-inducing pressures.

By way of summary, it will be appreciated that advantages afforded by the invention stem from the novel cooperative relationship between the rotors 17, 24, the generally circular pressure relief port 31 and its associated valve, and main port 14 of generally arcuate shape. Port 31 is opened and closed by lobes 25 alone, and main port 14 is opened and closed by ends of the portions (i.e., lobes) of rotor 24 that define grooves 26, port 14 having one of its edges extending along the arc of a circle described by the tips of lobes 25.

In FIG. 2, initially uncovered pressure relief port 31 is just beginning to be closed by the end of a lobe 25, and main discharge port 14 is just beginning to be uncovered by the end portion of rotor 24. The exposed curved end of port 14, as seen in FIG. 2, is in fact covered at all times by the intersecting or cusp portion of bores 15, 16, when the end plate 12 is assembled with housing 10. Also an opposite end portion of port 14 is covered by a central portion of rotor 24 when a maximum area of port 14 is exposed. By this construction a precise useful outflow area of port 14 is established, in achievement of the desired parameters as discussed hereinabove.

By virtue of the above described valving and porting, the deleterious effects of galling are overcome while achieving improved operating efficiency.

We claim:

1. A rotary screw compressor comprising: a housing having a pair of parallelly extending intersecting bores, and both inlet and discharge end walls closing said bores; a pair of intermeshing rotors mounted in said bores and forming, with said bores, chambers closed at their ends by said walls; a delivery region; a main outlet port in said discharge end wall providing communication between said chambers and said delivery region; a pressure relief outlet port adjacent said main outlet port communicating with said delivery region; said main outlet port and said pressure relief outlet port being so cooperably disposed that the relief port alone is caused to communicate initially with one of said chambers, followed by communication by both said ports simultaneously with said one chamber; and valve means in said pressure relief outlet port, said valve means being operable to move to open position in response to predetermined differences between the pressures in said chambers and in said delivery space, in excess of the normal differential pressures, while said relief port alone is in the recited communication with said one chamber.

2. A compressor according to claim 1, and further characterized in that one of said rotors comprises the main rotor and is provided with helical lobes, the other of said rotors comprises the gate rotor and is provided with helical grooves within which said helical lobes are received, and said pressure relief port is so positioned as to be opened and closed by said main rotor lobes.

3. A compressor according to claim 2, and further characterized in that said pressure relief port includes a generally circular valve seat, and said valve comprises a disk-shaped valve leaf free to move toward and away from said seat into and out of sealing engagement therewith, and a valve leaf stop comprising a member comprising means defining a generally planar surface region parallel to and spaced from the plane of said valve seat.

4. A compressor according to claim 3 and further characterized in that said valve leaf stop comprises the planar end surface of a generally cylindrical element axially aligned with said valve seat, said end surface having a pair of crossed grooves formed therein and a conical recess in the region of intersection of said grooves, whereby portions of said stop engaged by said valve leaf comprise generally arcuate surfaces.

5. A compressor according to claim 2, and further characterized in that said main outlet port is so positioned as to be opened and closed by ends of the groove-defining portions of said gate rotor.

6. A compressor according to claim 5, and further characterized in that said relief port is of generally circular cross-section, and in that said main outlet port is a generally arcuate slot one edge of which lies along an arc of a circle described by the tips of the lobes of said main rotor.

* * * * *